United States Patent
Simon

(10) Patent No.: US 7,885,733 B1
(45) Date of Patent: Feb. 8, 2011

(54) AVIATION NAVIGATIONAL AND FLIGHT MANAGEMENT SYSTEMS AND METHODS UTILIZING RADAR VECTORING

(75) Inventor: Jeffrey Mitchell Simon, Sudbury, MA (US)

(73) Assignee: Honeywell International Inc., Morristown, NJ (US)

( * ) Notice: Subject to any disclaimer, the term of this patent is extended or adjusted under 35 U.S.C. 154(b) by 980 days.

(21) Appl. No.: 11/695,866

(22) Filed: Apr. 3, 2007

Related U.S. Application Data

(60) Provisional application No. 60/788,638, filed on Apr. 3, 2006.

(51) Int. Cl.
G05D 1/00 (2006.01)
G01C 21/00 (2006.01)

(52) U.S. Cl. .............................. 701/4; 340/979; 701/1

(58) Field of Classification Search .................. 701/3–4, 701/14, 200–202, 211, 1; 340/963, 971, 340/973, 979
See application file for complete search history.

(56) References Cited

U.S. PATENT DOCUMENTS

| | | | |
|---|---|---|---|
| 2,784,307 A | 3/1957 | Burton | |
| 3,605,083 A | 9/1971 | Kramer | |
| 3,643,213 A | 2/1972 | Yurasek et al. | |
| 3,711,826 A | 1/1973 | La Russa | |
| 3,784,969 A | 1/1974 | Wilckens et al. | |
| 3,786,505 A | 1/1974 | Rennie | |
| 3,789,356 A | 1/1974 | Harenberg, Jr. et al. | |
| 3,843,554 A | 10/1974 | Aykan et al. | |
| 4,057,782 A | 11/1977 | Muller | |
| 4,316,252 A | 2/1982 | Cooper | |
| 4,368,517 A | 1/1983 | Lovering | |
| 4,419,079 A | 12/1983 | Georges et al. | |
| 4,419,731 A | 12/1983 | Puffett | |
| 4,660,157 A | 4/1987 | Beckwith et al. | |
| 4,825,374 A | 4/1989 | King et al. | |
| 4,999,780 A | 3/1991 | Mitchell | |
| 5,047,942 A | 9/1991 | Middleton et al. | |
| 5,101,357 A | 3/1992 | Tempelhof et al. | |
| 5,115,398 A | 5/1992 | De Jong et al. | |
| 5,343,395 A | 8/1994 | Watts | |
| 5,355,442 A | 10/1994 | Paglieroni | |

(Continued)

FOREIGN PATENT DOCUMENTS

EP 0 399 670 A2 11/1990

OTHER PUBLICATIONS

1st Class Moving Map, Digital Sky, (No Date).

(Continued)

*Primary Examiner*—Yonel Beaulieu
(74) *Attorney, Agent, or Firm*—Ingrassia Fisher & Lorenz, P.C.

(57) ABSTRACT

The present application provides systems and methods for providing navigational guidance during off-course operations, and techniques to revert back to a desired flight destination upon completion of such operations. In one aspect, an aviation navigational and/or flight management system is configured to alter guidance instructions from a predetermined flight plan for a desired destination to a particular set of radar vectors resulting in off-course flight operations. In another aspect, the system is configured to recalculate a flight plan to the desired final destination upon completion of the off-course operations without resulting in the loss of current historical flight data.

30 Claims, 3 Drawing Sheets

U.S. PATENT DOCUMENTS

| | | | |
|---|---|---|---|
| 5,566,073 | A | 10/1996 | Margolin |
| 5,638,282 | A | 6/1997 | Chazelle et al. |
| 5,904,724 | A | 5/1999 | Margolin |
| 6,057,786 | A * | 5/2000 | Briffe et al. ............... 340/975 |
| 6,236,913 | B1 * | 5/2001 | Bomans et al. ............... 701/3 |
| 6,804,585 | B2 | 10/2004 | Humbard et al. |
| 6,985,091 | B2 | 1/2006 | Price |
| 7,120,540 | B2 | 10/2006 | Meunier |
| 7,577,501 | B2 * | 8/2009 | Tafs et al. ................... 701/14 |
| 2002/0069019 | A1 | 6/2002 | Lin |
| 2007/0171094 | A1 | 7/2007 | Alter et al. |

OTHER PUBLICATIONS

3 SpaceFastrak, Polhemus, Jan. 1994.

Buening, Tactical Mapping in Combat Aircraft, IEEE, 5 pages, 1998.

Gallant, "System revolutionizes surveying and navigation", EDN, pp. 31-42, Jan. 7, 1993.

GPS 100 AVD Personal Navigator, Garmin International, Inc., 1991.

Hard Drivin, Atari Games Corp., 1988.

Jacobs et al., "Fractal Image Compression Using Iterated Transforms: Applications to DTED", NCCOSC RDT&E Div., pp. 1122-1128, Oct. 11, 1992.

Jeppensen Master Dabase, NavaData (undated).

KNS80 Integrated NAV System, Bendix/King, Apr. 1989.

Lyons, et al., "Some Navigational Concepts For Remotely Piloted Vehicles", Agard Conference Proceedings, Aug. 1976 (15 pgs.).

Magellan GPS Map 7000, Jan. 1999.

Pasman, W. et al., "Implementation of an Augmented Reality System on a PDA," Proc. ISMAR 2003, Tokyo, Japan, (Nov. 4-7, 2003).

Patrick, et al., "ITARS Robust Demonstration System Integration", IEEE, pp. 83-87, 1988.

Raymer, et al., "Advanced Terrain Data Processor", IEEE, pp. 636-639, 1994.

"Steel Talons", Atari Games Corp., 1991.

Trimble Navigation TNL 1000 GPS Navigator 1992 Pilot Guide, 2 pages.

Uijt De Haag, M. et al., "Terrain Database Integrity Monitoring for Synthetic Vision Systems," IEEE Trans. Aerospace & Electronic Sys. 41:386-406 (Apr. 2005).

U.S. GeoData Digital Line Graphs, U.S. Dept. of the Interior, 12 pages, Jun. 1993.

US GeoData Digital Elevation Models, U.S. Dept. of the Interior, 6 pages, Jun. 1993.

Vadlamani. A. et al., "Improved Downward-Looking Terrain Database Integrity Monitor and Terrain Navigation," Proc. IEEE Aerospace Conf. pp. 1594-1607 (Mar. 2004).

Vadlamani. A. et al., "A 3-D Spatial Integrity Monitor for Terrain Databases," Proc. 23d IEEE/AIAA Digital Avionics Systems Conf. (DASC) p. 4.C.2-1-4.C.2-13 (Oct. 2004).

* cited by examiner

AVIATION NAVIGATIONAL AND FLIGHT MANAGEMENT SYSTEMS AND METHODS UTILIZING RADAR VECTORING

BACKGROUND OF THE INVENTION

This application claims the benefit of the filing date of U.S. Provisional Patent Application Ser. No. 60/788,638, filed Apr. 3, 2006, for "Aviation Navigational and Flight Management Systems and Methods Utilizing Radar Vectoring," the teachings of which are incorporated herein by reference.

The present application pertains to aviation navigational and flight management systems and methods and, more particularly, to improved systems and methods for utilizing radar vectors in conjunction with navigational guidance information. Such systems and methods can be used for numerous applications including, but not limited to, real-time correction of navigational guidance based upon real-time off-course operations.

Current electronic aviation navigation systems allow an operator to prepare a desired flight plan between two locations. The flight plan data, which can be presented as a two-dimensional moving map or three-dimensional view, can be visualized on an electronic display, with an associated computer providing the visualization. As an aerial vehicle travels along the desired flight plan path, the actual location of the vehicle can be marked or indicated on the display relative to the desired flight plan. A course deviation indicator ("CDI") can be used to indicate to an operator how far off course a vehicle is relative to a desired course, allowing the operator to adjust the actual flight of the vehicle to attempt to match the desired flight plan. As such, current navigation systems can provide aerial vehicle operators with information to maintain a flight path consistent with a predetermined desired flight plan.

During actual flight operations, however, off-course operations are often initiated by Air Traffic Control ("ATC") or other sources to maintain safe air traffic operations due to heavy air traffic or poor weather conditions. Such operations are typically based on specified vectors indicating heading and altitude to be maintained by the aircraft. Such headings can be provided on an absolute, relative, or magnetic basis. Off-course operations are not accommodated by existing aviation navigation systems. Upon deviating from a desired flight plan due to a directed off-course radar vectoring, the navigation system constantly indicates the "erroneous" flight path of the vehicle, though such deviation is an intended operation. Accordingly, off-course vectoring is often performed manually, with vectoring directions written down on paper by aircraft pilots who are busily performing other piloting functions. Furthermore, upon completing off-course vectoring operations, the originally plotted flight path may not provide an efficient flight plan to the intended destination because the aerial vehicle's location is far from the desired path. Though a new flight path to the final destination may be replotted relative to the vehicle's current location, such recalculation can be disruptive to aerial vehicle operators during flight operations. These problems can be further compounded if multiple off-course vectoring operations occur during a particular trip.

An object of this invention is to provide improved methods and devices for aerial navigation.

A further object is to provide such methods and apparatus as are adapted for accommodating off-course vectoring operations.

A still yet further object of the invention is to provide such methods and apparatus as are adapted for use with visualization navigation aids.

SUMMARY OF THE INVENTION

The foregoing objects are among those attained by the invention which provides, in one aspect, aviation navigational and/or flight management systems and methods that accommodate real-time radar vectoring operations and/or course deviation information from a predetermined flight plan between an origin location and a desired final destination.

In related aspects, such aviation navigational and/or flight management systems can be configured to provide real-time, built-in guidance during off-course radar vectoring, and can optionally provide such guidance while maintaining actual historical flight data and associated flight plan data for reaching the desired final destination.

In further related aspects, such systems can be configured to recalculate a flight plan that provides real-time guidance to the desired final destination upon completion of radar vectoring operations, without losing historical flight data associated with the current flight.

In other related aspects, such aviation navigational systems can be practiced using a display to provide a graphical representation of the flight plan to the desired final destination, and any related radar vectoring flight operations being performed. Graphical representations include, without limitation, two-dimensional map representations (e.g., a moving map) and three-dimensional changing views, which can include an indicator showing the desired flight plan path or radar vectoring (e.g., a guidance line on a two-dimensional map or highway-in-the-sky ("HITS") symbology in a three-dimensional representation). The graphical display can also include an indicator showing the actual location of a vehicle relative to the desired flight plan or radar vectoring. Indicators showing a desired flight course, or an actual flight course, can also be represented by a heading and altitude in text format on the graphical display. Since heading can be specified in absolute, relative, or magnetic terms, an aviation navigational system can be configured to accept the heading in any of these terms, and/or to convert the heading into a desired basis. CDI can also be provided as part of the system to aid adjustment to maintain, or return to, a desired flight path.

Still other aspects provide such systems as can be configured to permit users to obtain flight data and plans as described herein using on-board systems that are portable, and/or built into an aerial vehicle. Such systems can include a display and a processing section which are in communication. The processing section can include connections to one or more data input sources that include a position sensor (e.g., an antenna in radio communication with a GPS or LORAN), a heading sensor (e.g., a magnetic heading source such as a compass), an altitude sensor, a source of weather data, etc.

Still further aspects provide methods that are in accord with the various operations performed by the systems described herein.

These and other aspects of the invention are evident in the drawings and in the description that follows. Advantages of methods and systems according to the invention include, among others, providing an aviation navigation that can provide real-time guidance during off-course radar vectoring. The methods and systems can also provide such radar vectoring guidance and revert back to providing guidance to a predetermined destination without losing current flight information.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
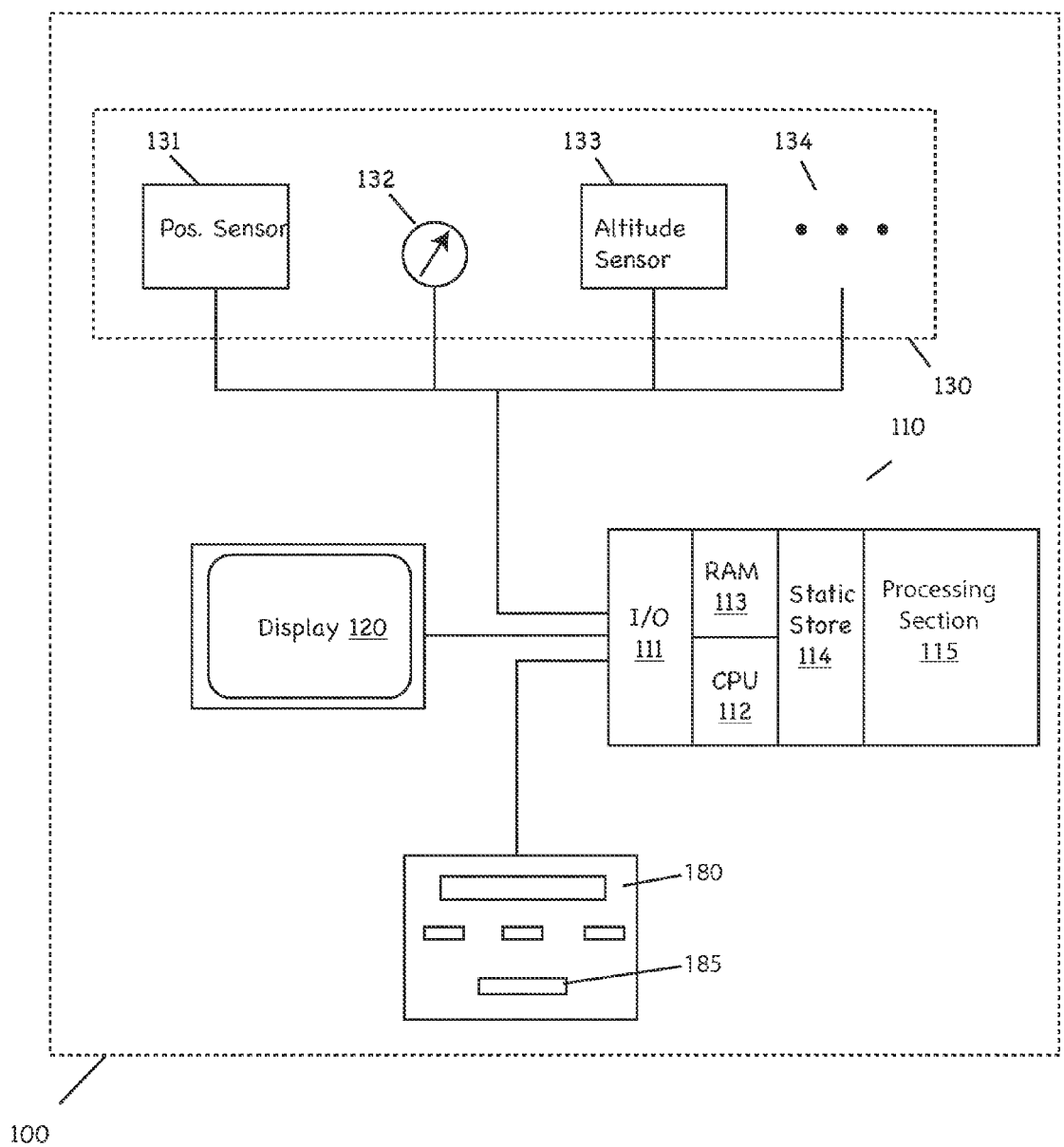
FIG. 1 depicts an exemplary aviation navigation system in accord with embodiments of the invention.

FIG. 1 depicts an exemplary aviation navigational system 100 according to one practice of the invention. The system 100 includes a display 120 that is coupled to a processing unit 110, both constructed and operated in accord with flight navigational systems of the type known in the art (for example, in accord with the VistaNav™ multifunction flight display, sold by the assignee hereof, Mercury Computer Systems Inc., Chelmsford, Mass.)—albeit adapted in accord with the teachings hereof.

The processing unit 110 can be configured with an input/output section 111 to receive data from a number of input devices, such as an array 130 of sensors that operate in the conventional manner known in the art, again as adapted in accord with the teachings of the present application. Types of sensors for gathering information for use by the system 100 can include position sensor systems 131 (e.g., an antenna for communication with a GPS or LORAN); heading sensor systems 132 (e.g., magnetic heading sources such as compasses and gyroscopes); altitude sensor systems 133; and other sensing systems or other data sources 134 (e.g., weather data such as wind and temperature measurements). System 100 can also include (or be coupled to) a static storage device 114 (e.g., CD-ROM, DVD, or other type of long-term storage device) storing information such as geographic mapping information, e.g., in the conventional manner known in the art.

The processing unit 110 can also be coupled to an input device 180, such as a keyboard, touchpad, or the like, permitting the pilot or other operator to provide inputs such as destination data for creating a flight plan. The input device 180 may also include a microphone (or other audio input device) and speech recognition functionality, permitting the pilot to provide such inputs via verbal commands. In accord with the teachings hereof, that input device 180 can also be utilized to permit radar vectoring, or to provide commands to transition from off-course radar vectoring back to a flight plan to reach the originally intended destination. For example, the input device 180 can include a radar revector button 185 or switch, which can cause the system 100 to recalculate a flight plan to an intended destination after off-course radar vectoring operations have been completed, as described in more detail herein.

The processing unit 110 itself can also include other conventional components known in the art (albeit adapted in accord with the teachings hereof) such as a central processing unit 112, random access memory 113, and a processing section 115 that can be configured to carry out the various functionalities of the system 100 (and, more particularly, for example, of the processing unit 110) as described herein.

Though FIG. 1 depicts an exemplary configuration of an aviation navigation system according to the invention, those skilled in the art will appreciate that other configurations can be used to perform the functions described herein. For example, various ones of the devices shown and described separately herein (such as the display 120 and the input unit 180) can be integrated together as a single physical unit; conversely, components of individual ones of the devices (such as processing unit 110 and static store 114) can be embodied as physically distinct units that are coupled to one another for communication in accord herewith. Furthermore, communications coupling between devices can be through a physical connection (e.g., a wired connection), through wireless (e.g., RF) connection or other remote communication system. As well, the display 120, processing unit 110, and input device 180 can be embodied as a stand-alone portable device that can be easily transferred between aerial vehicles, or the system pieces can be embedded within the console of an aerial vehicle. All these variations, and others, are clearly contemplated within the scope of the present invention.

Figure 2:
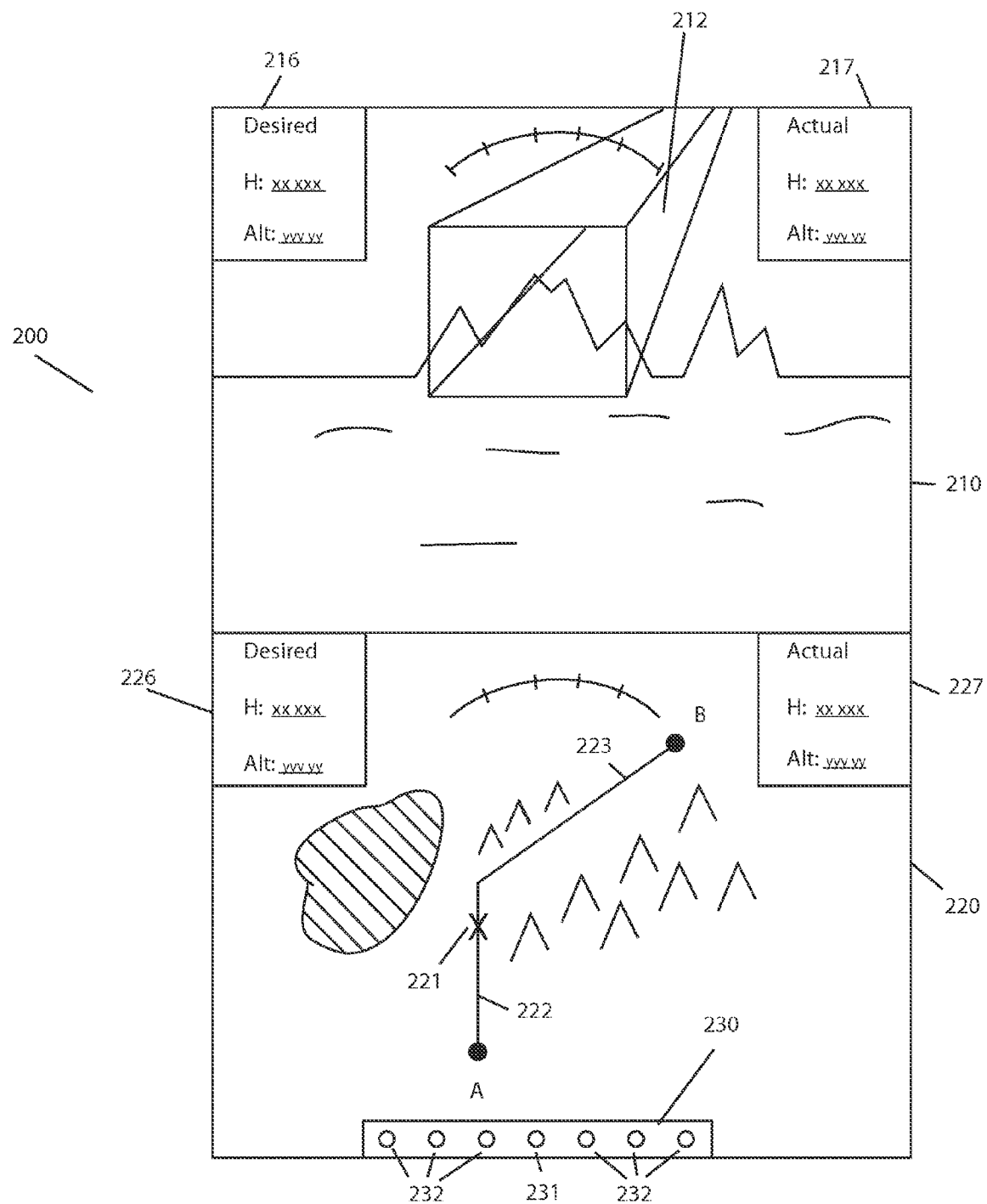
FIG. 2 depicts an electronic display showing an exemplary graphical representation of flight plan and actual flight data in two-dimensional and three-dimensional formats.
Figure 3A:
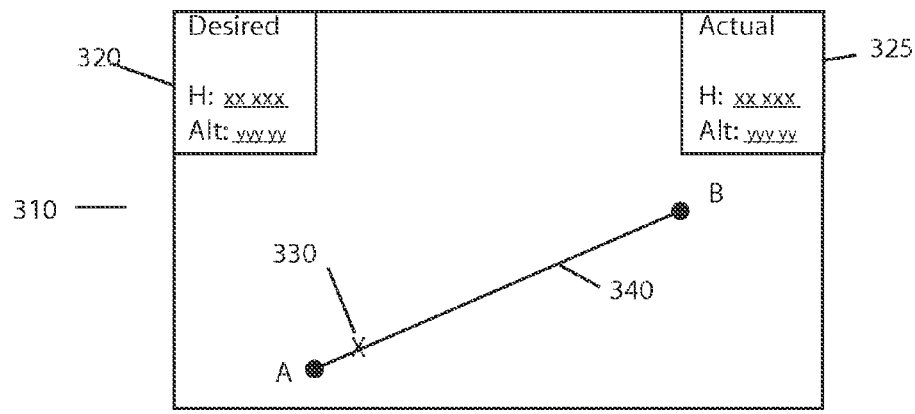
FIG. 3A depicts a two-dimensional graphical representation of a flight path between an origin A and destination B, along with the present location of an aerial vehicle.
Figure 3B:
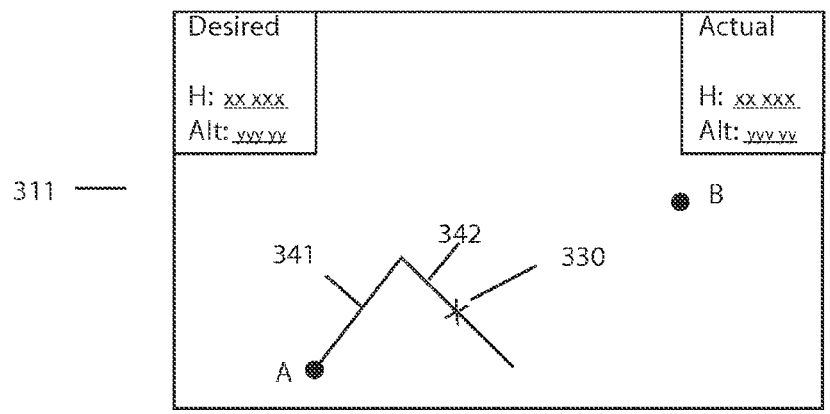
FIG. 3B depicts a two-dimensional graphical representation, wherein the flight path of FIG. 3A has been altered to accommodate a radar vector for an off-course operation.
Figure 3C:
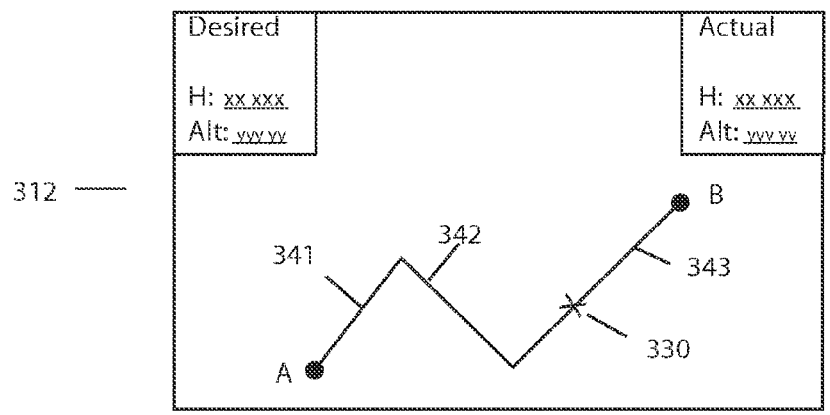
FIG. 3C depicts a two-dimensional graphical representation, wherein the off-course operations shown in FIG. 3B have been ceased, and a recalculated flight path to the final destination B has been displayed.

Display 120 is of the conventional type known in the art that responds to signals generated by processing unit 110 to display information to an operator—and specifically, in accord with the teachings hereof, in order to provide dynamic graphical representations of various system data, including flight paths, flight plans (as shown in FIGS. 2-3C and discussed below). Illustrated display 120 also responds to signals generated by processing unit 110 in accord with the teachings hereof to provide, for example, real-time guidance based on radar vectoring and/or course recalculation following the conclusion of such revectoring (as shown, for example, in FIGS. 3A-3C and discussed below).

Such graphical representations as used in the illustrated embodiment can be based arranged in a variety of configurations. Some exemplary embodiments are shown in the graphical representation 200 depicted in FIG. 2. There, a presentation 200 is split into two separate representations: a two-dimensional planar map 220 and a three-dimensional dynamic view 210. Existing aviation navigation systems can provide general two-dimensional or three-dimensional representations as depicted in FIG. 2; however, they cannot accommodate the various radar vectoring and other features of the embodiments of the invention described herein. Of course, a dynamic graphical representation within the scope of the present invention can utilize a display that only shows one of the 2D or 3D representations, or only allows one to be shown at a time with some type of toggling allowed between the two representations. Other representations, such as a synthetic vision system, can also be employed.

The two-dimensional representation 220 of FIG. 2 includes a planar map with a flight plan path depicted by the line segments 222, 223 connecting the trip's origin A with the trip's final predetermined destination B. The marking "X" 221 shows the current location of the aerial vehicle with respect to the flight plan path 222, 223, the marking 221 moving relative to the map 220 in correspondence with the changes in the actual location of the aerial vehicle. The real-time flight plan path is represented textually by the data provided in window 226 presenting a desired vector described by heading and altitude values. The term "heading," as utilized in the present application, can be provided on an absolute basis, a relative basis, or a magnetic basis in accord with the use of such directions by ATC. Accordingly, an aviation navigational system according to the invention can be configured to utilize heading readings on any of these three bases, and others as typically practiced, and/or can be configured to inter-convert between two or more heading bases to increase the flexibility of the system to potential users. This window 226 can also present the desired radar vector during an off-course operation, as described below in further detail.

Those skilled in the art will appreciate that other types of two-dimensional mappings can also be used to provide graphical representations of flight plans and actual flight operations. For example, in contrast to the mapping 220 of FIG. 2 that shows the entire planned flight path between origin A and destination B, a two-dimensional mapping can be a moving map representation in which the two-dimensional image shows a larger scale map that moves as the flight proceeds to provide a real-time local view relative to the current vehicle location.

As well, the current direction of the aerial vehicle can be textually represented by the data in window 227, showing the actual heading and altitude of the vehicle. The difference between the actual direction and location of the aerial vehicle and the desired flight path, i.e., the course deviation information, can be used to provide an indication to the user of how to rectify flight operation to bring the aerial vehicle into line with the desired flight plan, or that the current flight operation is consistent with the desired flight plan.

The image 230 serves as an exemplary course deviation indicator ("CDI") to indicate the difference between a desired flight path and the actual flight path, and thus how to correct the current path to approach the desired flight path. For the CDI 230 in FIG. 2, the darkened center circle 231 indicates correspondence between the desired and actual flight paths. The remaining circles 232, when darkened, provide an indication of how far the pilot needs to turn in the indicated direction to bring the actual flight path into alignment with the desired flight path.

The dynamic three-dimensional view 210 presents similar data to that displayed in the two-dimensional representation 220. The view 210 depicts a landscape, three-dimensional depiction, which can have varying amounts of geographic detail (e.g., showing mountains or water bodies) depending upon the data base utilized to create the depiction. As the location of the aerial vehicle changes with time, the view 210 is altered to depict the locality of the current position of the vehicle. Like the two dimensional depiction, windows 216, 217 can contain textual vectoring data (e.g., heading and altitude data) related to a desired flight path and actual flight operation, respectively. The desired flight path in the three-dimensional view 210 can be represented by a HITS symbology, such as the tunnel 212 depicted in the view 210. The vehicle operator attempts to maintain the aerial vehicle within the tunnel 212 to keep the vehicle on the desired flight path. Other representations of the desired flight path can include using a series of shapes (e.g., boxes, circles, or other shapes) that provide guidance for the vehicle operator as to where to steer the aerial vehicle, or that provide some other graphical indicator on the three-dimensional view to indicate where the desired flight path lies. Deviations between the actual and desired flight paths can again be corrected using a CDI as described above.

Operation of the system 100, as described above, may be further understood by reference to the time-sequenced two-dimensional views depicted in FIGS. 3A-3C. It will be appreciated that two-dimensional views are shown here for convenience and that, in practice, display 120 may be driven by processor 110 to present three-dimensional views instead or in addition.

As depicted in FIG. 3A, a desired flight plan path 340 is plotted between an origin A and a chosen destination B. A flight plan on which the path 340 is based can be chosen by entering a desired destination and origin into the processing unit 110 using the input unit 180. The desired flight path 340 can be calculated by the system 100 of FIG. 1 using data representing the geographic locations of A and B, which can be stored on static storage 114, and accounting for weather conditions that can be provided by real-time data sensors or sources 134. Such calculation can be performed in the conventional manner known in the art. The actual flight location 330 of the aerial vehicle can also be plotted on the two-dimensional map 310. This location can be updated real-time as the vehicle progresses through the air. The data for the actual flight location can be provided by a position sensor 131. The desired heading (e.g., magnetic heading) and altitude can be displayed in text box 320, with the actual vehicle heading and altitude displayed in text box 325. Sensors, such as the altitude sensor 133 and the heading sensor systems 132 (e.g., a compass), can be employed to provide the actual heading and altitude data, while the desired heading and altitude data can be generated by comparing the actual vehicle position with a desired position along the flight path, and calculating a path to bring the vehicle onto the desired flight path and/or to maintain the vehicle on the desired flight path. Such calculations can be performed using the processing unit 110.

At a later moment, an off-course operation can be initiated by the pilot in response to an ATC request to alter a desired flight plan due to inclement weather, air traffic, or other disruptions. Upon being requested to alter course to a particular radar vector heading and altitude, such radar vectors can be explicitly entered into an aerial navigation system by using an input unit 180, as shown in FIG. 1. Where input 180 is so equipped, radar vector operations may be initiated and/or heading and altitude information may be entered via voice, e.g., based on command spoken by the pilot, copilot, or other, by way of non-limiting example. The system 100 adjusts the two-dimensional flight plan map 311 by showing that original flight plan path 341 is altered to a new heading and altitude 342 as depicted in FIG. 3B. Marking 330 shows the aerial vehicle following the desired radar vector off-course route. The desired and actual heading and altitude text boxes can be correspondingly adjusted, the former in accord with the radar vector information entered via input unit 180 and the latter in accord with data gathered appropriately from the system sensors 130. Of course, during off-course operations, several different radar vectors can be entered (e.g., via unit 180) relating to particular adjustments in flight as commanded by ATC or the pilot. In this regard, the illustrated embodiment can allow an aviation navigation system to provide real-time active guidance for off-course operations and can maintain historical flight data associated with earlier flight operations.

Upon completion of off-course operations, an aerial navigational and/or flight management system according to the invention can be configured to cease display of radar vectors 342, and can calculate a new course to the desired destination 343 as depicted in FIG. 3C. Correspondingly, the desired heading and altitude data values can be adjusted to reflect the new flight plan, and provide real-time guidance to the aircraft operator. Such a change in the display can be activated in the system 100 of FIG. 1 by pressing a radar revector button 185 on the input unit 180 to cause the processing unit 110 to calculate a new flight path 343 based upon the position of the aerial vehicle at the time revectoring is initiated, the final destination location, weather data, and other factors as understood by those skilled in the art. The system 100 can also track the current location of the aerial vehicle 330 with respect to the newly calculated path 343. As previously discussed, desired and actual heading and altitude can also be displayed textually. The system can also maintain historical flight data 341, 342 such that information is not lost by the system 100 upon recalculating a flight plan to the desired destination B. All calculations and tracking can be performed in the conventional manner known in the art, albeit adapted to include the teachings of the present application. In addition, it is understood that radar vectoring can be reinitiated anywhere along path 343 if required—upon completion of the additional off-course operations, yet another new plot to the final destination can be calculated by again deactivating the radar vectoring mode. Radar vectoring can be reinitiated as many times as is necessary. Finally, if radar vectors are employed in the local vicinity to the final destination (e.g., merging traffic into an IFR or VFR approach), an aviation navigational system can be configured to provide automatic guidance for landing approach upon cancellation of the vectoring function or feature.

Described above are systems and methods meeting the objects set forth earlier. Those skilled in the art will appreciate that the embodiments presented herein are merely examples and that other embodiments, incorporating changes thereto, fall within the scope of the invention. Thus, by way of non-limiting example, it will be appreciated that the specific arrangement of the presentations of FIGS. 1-3C is merely by way of example and shall not be construed to limit the invention. Those skilled in the art will also appreciate that systems according to the invention can additionally be programmed for vectored guidance automatically to account for weather, air traffic or other events that can alter typical flight operations. Such automatic vector guidance can be triggered by a number of mechanisms such as transmission of signaling from ATC, automatic dependent surveillance—broadcast, or mechanisms providing communication regarding flight operations. Moreover, systems according to the invention can be adapted to control flight autopilot, e.g., to automatically effect instructed vectoring operation.

In view of the foregoing, what I claim is:

1. An aviation navigational apparatus for use with an aerial vehicle and capable of accommodating real-time vectoring operations, comprising:
    a display;
    a processor in coupling communication to the display, the processor configured to generate signals for effecting presentation on the display of a current location of the aerial vehicle relative to at least one displayed path;
    the processor being further configured to generate signals for effecting presentation on the display of
    (i) a desired path between a first location and a second location,
    (ii) an off-course path for at least one real-time radar vectoring operation, and
    (iii) a revised path between a recalculation location and the second location.

2. The aviation navigational apparatus of claim 1, wherein the revised path is between an aerial vehicle location at the time the revised path is initiated ("recalculation location") and the second location, the revised path being presented on the display after the display presents the off-course path.

3. The aviation navigational apparatus of claim 1, wherein the off-course path is presented on the display after the processor receives a real-time input corresponding to the at least one real-time vectoring operation.

4. The aviation navigational apparatus of claim 3, further comprising:
    an input device coupled to the processor, the input device configured to accept the real-time input.

5. The aviation navigational apparatus of claim 4, wherein the input device is configured to access the real-time input by any of keyboard or touchpad.

6. The aviation navigational apparatus of claim 4, wherein the input device is configured to access the real-time input by voice.

7. The aviation navigational apparatus of claim 1, wherein the revised path is presented on the display after the processor receives an activation signal.

8. The aviation navigational apparatus of claim 7, further comprising:
    an input device coupled to the processor, the input device configured to provide the activation signal to the processor upon receiving an external input.

9. The aviation navigational apparatus of claim 1, further comprising:
    at least one sensor for providing data to the processor for calculating at least one of the desired path, the off-course path, and the revised path.

10. The aviation navigational apparatus of claim 1, wherein the processor is configured to maintain historical flight data of the aerial vehicle after generating signals for effecting presentation on the display of any one of the off-course path and the revised path.

11. The aviation navigational apparatus of claim 10, wherein the processor is configured to generate signals effecting presentation on the display corresponding to the historical flight data.

12. The aviation navigational apparatus of claim 1, wherein the processor is configured to generate signals for effecting presentation on the display of at least one of the desired path, the off-course path, and the revised path, the representation being at least one of a two-dimensional representation and a three-dimensional representation.

13. The aviation navigational apparatus of claim 1, wherein the processor is configured to generate signals for effecting presentation on the display of text indicating at least one of desired path data, revised path data, and the current location of the aerial vehicle.

14. The aviation navigational apparatus of claim 1, wherein the apparatus is portable.

15. A method of accommodating real-time vectoring operations during an aerial vehicle's flight, comprising:
    tracking progress of the aerial vehicle along a desired path between a first location and a second location on a display;
    creating an off-course path responsive to at least one real-time vector command directing the aerial vehicle to deviate from the desired path while the aerial vehicle is in flight, and tracking the aerial vehicle's progress along the off-course path on the display; and
    presenting a revised path beginning at a recalculation location to provide tracking of the aerial vehicle's progress between the recalculation location and the second location on the display.

16. The method of claim 15, wherein the at least one real-time vector command includes an altitude and a heading.

17. The method of claim 15, wherein the step of creating the off-course path comprises:
    issuing a plurality of real-time vector commands; and changing the off-course path in accordance with each of the real-time vector commands.

18. The method of claim 15, wherein the step of presenting the revised path comprises concluding real-time vector command with direct instruction.

19. The method of claim 15, wherein the step of tracking progress of the aerial vehicle comprises utilizing data from a sensor to track progress of the aerial vehicle along the desired path.

20. The method of claim 15, further comprising:
providing a representation of geography over which the aerial vehicle is flying and presenting at least one of the desired path, the off-course path, and the revised path relative to that representation, the representation being at least one of a two-dimensional representation and a three-dimensional representation.

21. The method of claim 15, further comprising:
maintaining historical flight data of the aerial vehicle after creating the off-course path or presenting the revised path.

22. An aviation vehicle tracking system capable of accommodating real-time vectoring operations, comprising:
a first tracking mode configured to visually display progress of the aerial vehicle relative to a desired path between a first location and a second location;
a second tracking mode configured to accept at least one real-time vector operation that deviates from the desired path and to visually display progress of the aerial vehicle relative to the at least one real-time vector operation; and
a third tracking mode configured to visually display progress of the aerial vehicle relative a revised path toward the second location.

23. The aviation vehicle tracking system of claim 22, wherein the third tracking mode is further configured to provide the revised path between a recalculation location and the second location.

24. The aviation vehicle tracking system of claim 23, wherein the recalculation location is an aerial vehicle location when the system initiates the third tracking mode.

25. The aviation vehicle tracking system of claim 22, wherein each tracking mode includes an indicator signal configured to visually display a current position of the aerial vehicle.

26. The aviation vehicle tracking system of claim 22, wherein the third tracking mode is configured to maintain historical flight data of the aerial vehicle after the at least one real-time vector operation.

27. The aviation vehicle tracking system of claim 22, wherein each tracking mode is configured to visually display the progress of the aerial vehicle with at least one of a two-dimensional graphical representation and a three-dimensional graphical representation.

28. The aviation vehicle tracking system of claim 22, wherein the third tracking mode is configured to provide the revised path based at least upon direct instruction.

29. The aviation vehicle tracking system of claim 22, wherein each tracking mode is configured to visually display the progress of the aerial vehicle using data acquired from at least one sensor.

30. The aviation vehicle tracking system of claim 22, wherein the system is configured as a portable system.

* * * * *